United States Patent
Cable et al.

(10) Patent No.: US 11,274,202 B2
(45) Date of Patent: Mar. 15, 2022

(54) COPOLYESTER RESIN COMPOSITION WITH IMPROVED MELT FLOW PROPERTIES

(71) Applicant: Eastman Chemical Company, Kingsport, TN (US)

(72) Inventors: Kevin Michael Cable, Kingsport, TN (US); Jeffrey Alan Galloway, Florence, KY (US); Thomas Joseph Pecorini, Kingsport, TN (US); Jonathan Horton, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 81 days.

(21) Appl. No.: 16/641,755

(22) PCT Filed: Aug. 22, 2018

(86) PCT No.: PCT/US2018/047496
§ 371 (c)(1),
(2) Date: Feb. 25, 2020

(87) PCT Pub. No.: WO2019/046064
PCT Pub. Date: Mar. 7, 2019

(65) Prior Publication Data
US 2020/0263027 A1      Aug. 20, 2020

Related U.S. Application Data

(60) Provisional application No. 62/551,941, filed on Aug. 30, 2017.

(51) Int. Cl.
*C08L 67/02*      (2006.01)

(52) U.S. Cl.
CPC .......... *C08L 67/02* (2013.01); *C08L 2205/025* (2013.01); *C08L 2205/06* (2013.01)

(58) Field of Classification Search
CPC ...................................................... C08L 67/02
See application file for complete search history.

(56) References Cited

U.S. PATENT DOCUMENTS

| | | |
|---|---|---|
| 4,588,806 A | 5/1986 | Aycock et al. |
| 5,824,398 A | 10/1998 | Shih |
| 6,906,164 B2 | 6/2005 | DeBruin |
| 7,030,181 B2 | 4/2006 | Moskala et al. |

(Continued)

OTHER PUBLICATIONS

Notification of Transmittal of The International Search Report and The Written Opinion of the International Searching Authority, or the Declaration dated Oct. 16, 2018; International Application No. PCT/US2018/047496.

(Continued)

*Primary Examiner* — Michael F Pepitone
(74) *Attorney, Agent, or Firm* — Robert C. Morriss

(57) ABSTRACT

A copolyester resin composition is described. The copolyester resin composition includes a linear copolyester polymer and a linear copolyester oligomer. A particularly suitable linear copolyester oligomer is an intermediate of the copolyester polymer. The composition exhibits improved melt flowability and is therefore particularly useful in the manufacture of products made via injection molding methods. A process for forming the composition is also described.

17 Claims, 1 Drawing Sheet

(56) References Cited

U.S. PATENT DOCUMENTS

| | | | |
|---|---|---|---|
| 7,576,171 B2 | 8/2009 | Crawford et al. | |
| 7,781,562 B2 | 8/2010 | Crawford et al. | |
| 7,803,439 B2 | 9/2010 | Crawford et al. | |
| 7,951,900 B2 | 5/2011 | Crawford et al. | |
| 8,133,967 B2 | 3/2012 | Pecorini et al. | |
| 8,410,219 B2 | 4/2013 | Chen | |
| 8,586,701 B2 | 11/2013 | Barton et al. | |
| 2006/0287496 A1 | 12/2006 | Crawford et al. | |
| 2007/0173630 A1 | 7/2007 | Bahr et al. | |
| 2007/0276065 A1* | 11/2007 | Barton | C08G 63/85 524/132 |
| 2008/0315453 A1* | 12/2008 | Molitor | B82Y 30/00 264/209.1 |
| 2013/0072628 A1 | 3/2013 | Crawford et al. | |

OTHER PUBLICATIONS

ASTM D-7028; Standard Test Method for Glass Transition Temperature (DMA Tg) of Polymer Matrix Composites by Dynamic Mechanical Analysis (DMA)[1]; Published Aug. 2015.

ASTM D-3123; "Standard Test Method for Spiral Flow of Low-Pressure Thermosetting Molding Compounds [1]"; Published Aug. 2017.

ASTM D-638; "Standard Test Method for Tensile Properties of Plastic"; Published Mar. 2015.

ASTM D-256; "Standard Test Methods for Determining the Izod Pendulum Impact Resistance of Plastics"; Published Nov. 2018.

\* cited by examiner

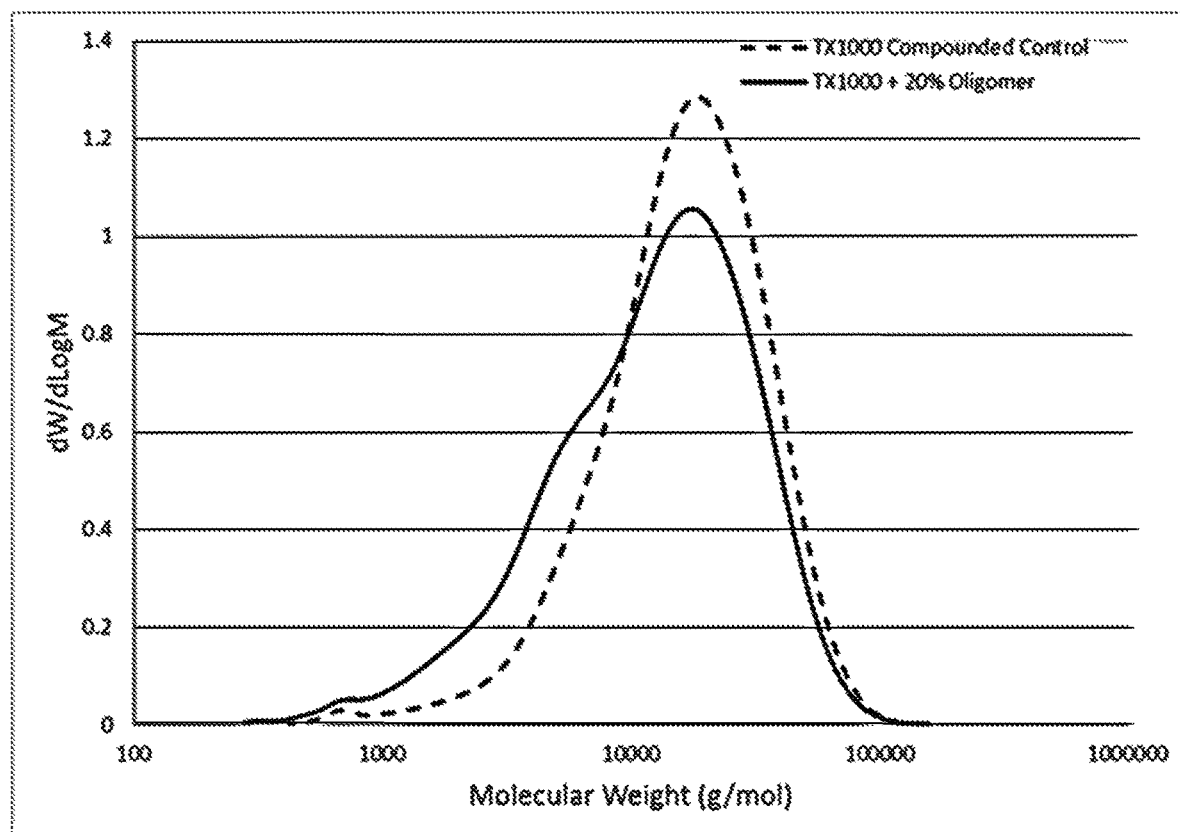

COPOLYESTER RESIN COMPOSITION WITH IMPROVED MELT FLOW PROPERTIES

CROSS-REFERENCE TO RELATED APPLICATION(S)

This application is a national stage filing under 35 USC § 371 of PCT/US2018/047496, filed on Aug. 22, 2018, which claims the benefit of the filing date to U.S. Provisional Application No. 62/551,941, filed on Aug. 30, 2017, the entire disclosures of which are incorporated by reference herein.

FIELD OF THE INVENTION

The present invention relates to copolyester resin compositions that exhibit improved flow properties when in melt form and are therefore particularly useful in injection molding, extrusion, 3D printing (e.g., fused filament fabrication), and similar applications.

BACKGROUND OF THE INVENTION

High molecular weight, thermoplastic linear copolyesters may generally be formed by reacting one or more diester with one or more diol under suitable polymerization conditions. Particular copolyesters that are useful in a wide variety of applications may be formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol. Such copolyesters are described for example in U.S. Pat. Nos. 7,781,562 and 8,586,701, assigned to the assignee of the present invention, the contents and descriptions of which are incorporated herein by reference. Utilities for these copolyesters and compositions containing them as a component are numerous and diverse, and are described for example in U.S. Pat. Nos. 7,576,171 (pacifiers); 7,951,900 (dialysis filer housings); 7,803,439 (blood therapy containers); and 8,133,967 (restaurant smallware), the contents and descriptions of which are also incorporated herein by reference and all of which are also assigned to the assignee of the present invention.

The linear copolyesters described above have achieved significant commercial success, in part because their combination of performance parameters such as toughness, glass transition temperature, density, crystallization rate, melt viscosity and chemical resistance translate to numerous benefits for both product manufacturers and the consumers who purchase these products. In a continuing effort to expand the sale, use and applicability of compositions that contain these copolyesters into new markets, however, polymer manufacturers seek to tailor composition characteristics and parameters to meet product manufacturer specifications in as-yet untapped product applications. By way of example, the relatively high melt viscosity (an indicator or gauge of melt flow) of some of these copolyesters, while desired in some applications, could discourage manufacturers from considering them as candidates for use in other applications, for example certain end-use products formed using injection molding and similar methods, where manufacturer equipment and tooling could require modification or replacement to process them.

Various techniques have been suggested in pursuit of improving the melt flow characteristics of polymer resin compositions. As a general matter, melt flow rate inversely correlates with molecular weight, with higher melt flow rate corresponding to lower molecular weight. It is therefore known that using a polymer with a relatively lower molecular weight of the polymer component in a polymer resin composition, or adding to the composition a polymer of relatively lower molecular weight, will lower melt flow and improve melt flowability; however, introducing such lower molecular weight components can negatively impact other desired compositional characteristics such as tensile and impact. Alternatively, additives known as flow promoters, for example, zinc stearate, calcium stearate, steric acid, and waxes, can achieve improved melt flowability for polymer resin compositions; however, they can create critical negative performance effects in the final molded article or can even decompose during processing and/or deposit on mold surfaces thereby damaging the surface of a molded article.

U.S. Patent Application Publication No. 2007/0173630 describes the use of macrocyclic polyester oligomers as additives in linear thermoplastics (including polyesters) for improved flow and processability. These macrocyclic oligomers exhibit a very specific chemical structure that requires separate and purposeful manufacture under controlled conditions and therefore could be costly to manufacture. Further, the amount of macrocyclic polyester oligomer that may be utilized to demonstrate improved melt flow rate "without significant effects of the other properties of the resulting compositions" is "less than 5%". Also, the chemical structure of the oligomer itself can introduce undesirable functionalities and reduced performance into the final composition.

Despite these suggested techniques, therefore, the need remains for a copolyester resin composition that exhibits melt flow properties that provides greater latitude for various injection molding and similar processing/manufacturing techniques, while still exhibiting impact, tensile and other performance properties that make these copolyesters commercially desirable.

SUMMARY OF THE INVENTION

In a first aspect, the present invention relates to a copolyester resin composition. The composition of the present invention generally and broadly includes a linear copolyester polymer and a linear copolyester oligomer. Linear polymers and oligomers contain essentially no short or long chain branching and their repeat units are not substantially macrocyclic in structure and/or form.

In another aspect, the present invention relates to an injection molded article. The injection molded article of the present invention is molded from a copolyester resin composition that includes a linear copolyester copolymer and a linear copolyester oligomer.

In still another aspect, the present invention relates to a process for forming a copolyester resin composition with improved melt flowability. The process of the present invention includes (i) providing a linear copolyester polymer; (ii) providing a linear copolyester oligomer; and iii) mixing the linear copolyester copolymer and the linear copolyester oligomer to form the copolyester resin composition.

Further aspects of the invention are as disclosed and claimed herein.

BRIEF DESCRIPTION OF THE DRAWINGS

The invention will be described in further detail below and with reference to the accompanying drawings, wherein like reference numerals throughout the figures denote like elements and in wherein FIG. 1 is a graphical representation of the molecular weight distribution of a copolyester resin composition of the present invention as formed according to Example 2 below.

DETAILED DESCRIPTION

The present invention, in a first aspect, relates to a copolyester resin composition. The term "copolyester" is understood to mean a synthetic polymer prepared by the reaction of one or more difunctional carboxylic acids with one or more difunctional hydroxyl compounds. Typically, the difunctional carboxylic acid can be a dicarboxylic acid and the difunctional hydroxyl compound can be a dihydric alcohol such as, for example, glycols and diols. The term "glycol" as used herein includes, but is not limited to, diols, glycols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The copolyester resin composition of the present invention includes a linear copolyester polymer and a linear copolyester oligomer. As used herein, a "linear copolyester polymer" is a copolyester in which the molecules form long chains substantially without branches or crosslinked structures. In embodiments, the linear copolyester polymer has less than 2, or less than 1 percent branching or crosslinking. In embodiments of the invention, the linear copolyester polymer is a polymer with repeat units of the formula:

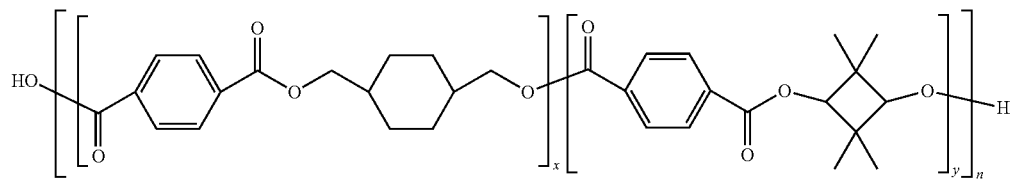

and the linear copolyester oligomer is an oligomeric compound with repeat units of the formula:

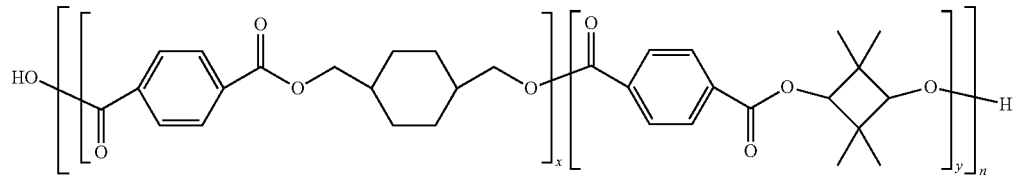

wherein, for each of the linear copolyester polymer and oligomer, the value for x can be in a range from 0.5 to 0.9, or 0.55 to 0.85, or 0.6 to 0.8; and the value for y can be in a range from 1-x. Although the polymer and oligomer may each have the same ranges for x and y, the value of x and y in a particular embodiment may be the same or different for the polymer and the oligomer. In one embodiment, the values for x and y are essentially the same for the polymer and the oligomer. In embodiments, for the linear copolyester polymer, the value for n can be in a range from 40 to 100, or 50 to 90, or 60 to 80. In embodiments, for the linear copolyester oligomer, the value for n can be in a range from 10 to 40, or 15 to 35, or 20 to 30. It should be noted that the notation used in the above formulas for the repeat unit does not specify any particular morphology for the polymer or oligomer and merely shows the relative molar percentages of the repeat units. In one embodiment, the monomer incorporation is random and the polymer and oligomer having the specified repeat units are both linear random structures.

In embodiments of the invention, the linear copolyester polymer of the copolyester resin composition of the present invention includes a dicarboxylic acid component and glycol component. The dicarboxylic acid component includes terephthalic acid residues and the glycol component includes 2,2,4,4-tetramethyl-1,3-cyclobuanediol residues and 1,4-cyclohexanedimethanol residues. In certain embodiments, the glycol component includes 2,2,4,4-tetramethyl-1,3-cyclobuanediol residues in an amount from 10 to 50 mole % and 1,4-cyclohexanedimethanol residues in an amount from 50 to 90 mole %, based on the glycol component being 100 mole %. In various embodiments, the glycol component of the polymer can comprise: 2,2,4,4-tetramethyl-1,3-cyclobuanediol residues in an amount from 20 to 40 mole % and 1,4-cyclohexanedimethanol residues in an amount from 60 to 80 mole %; or 2,2,4,4-tetramethyl-1,3-cyclobuanediol residues in an amount from 20 to 35 mole % and 1,4-cyclohexanedimethanol residues in an amount from 65 to 80 mole %; or 2,2,4,4-tetramethyl-1,3-cyclobuanediol residues in an amount from 20 to 30 mole % and 1,4-cyclohexanedimethanol residues in an amount from 70 to 80 mole %; or 2,2,4,4-tetramethyl-1,3-cyclobuanediol residues in an amount from 25 to 40 mole % and 1,4-cyclohexanedimethanol residues in an amount from 60 to 75 mole %; or 2,2,4,4-tetramethyl-1,3-cyclobuanediol residues in an amount from 30 to 40 mole % and 1,4-cyclohexanedimethanol residues in an amount from 60 to 70 mole %.

The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make copolyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make copolyester.

In embodiments of the invention, the inherent viscosity (IV) of the linear copolyester polymer can be in the range from 0.50 to 1.00 dL/g, or 0.55 to 0.90 dL/g, or 0.60 to 0.85 dL/g, as measured in 60/40 (wt/wt) phenol/tetrachloroethane at a concentration of 0.5 g/100 ml at 25° C. In one embodiment, the inherent viscosity (IV) of the linear copolyester polymer is preferably from 0.60 to 0.75 dL/g as measured in 60/40 (wt/wt) phenol/tetrachloroethane at a concentration of 0.5 g/100 ml at 25° C. One of ordinary skill in the art will appreciate that inherent viscosity values may also be made by calculated using measured molecular weight data.

In embodiments of the invention, the linear copolyester oligomer of the copolyester resin composition of the present invention includes a dicarboxylic acid component and a glycol component. The dicarboxylic acid component includes terephthalic acid residues and the glycol component includes 2,2,4,4-tetramethyl-1,3-cyclobuanediol residues and 1,4-cyclohexanedimethanol residues. In certain embodiments, the glycol component includes 2,2,4,4-tetramethyl-1,3-cyclobuanediol residues in an amount from 10 to 50 mole % and 1,4-cyclohexanedimethanol residues in an amount from 50 to 90 mole %, based on the glycol component being 100 mole %. In various embodiments, the glycol component of the polymer can comprise: 2,2,4,4-tetramethyl-1,3-cyclobuanediol residues in an amount from 20 to 40 mole % and 1,4-cyclohexanedimethanol residues in an amount from 60 to 80 mole %; or 2,2,4,4-tetramethyl-1,3-cyclobuanediol residues in an amount from 20 to 35 mole % and 1,4-cyclohexanedimethanol residues in an amount from 65 to 80 mole %; or 2,2,4,4-tetramethyl-1,3-cyclobuanediol residues in an amount from 20 to 30 mole % and 1,4-cyclohexanedimethanol residues in an amount from 70 to 80 mole %; or 2,2,4,4-tetramethyl-1,3-cyclobuanediol residues in an amount from 25 to 40 mole % and 1,4-cyclohexanedimethanol residues in an amount from 60 to 75 mole %; or 2,2,4,4-tetramethyl-1,3-cyclobuanediol residues in an amount from 30 to 40 mole % and 1,4-cyclohexanedimethanol residues in an amount from 60 to 70 mole %.

In embodiments of the invention, the inherent viscosity (IV) of suitable linear copolyester oligomers may be at least one of the following: less than 0.60 dL/g, less than 0.50 dL/g, less than 0.40 dL/g and less than 0.30 dL/g, and preferably is within at least one of the following ranges: from 0.10 to 0.59 dL/g, from 0.10 to 0.50 dL/g, from 0.10 to 0.40 dL/g or from 0.10 to 0.30 dL/g as determined in 60/40 (wt/wt) phenol/tetrachloroethane at a concentration of 0.5 g/100 ml at 25° C.

Particularly suitable linear copolyester polymers for the composition of the present invention are formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol in a reaction product stream. Such copolyesters and methods for their manufacture are described for example in heretofore referenced and incorporated by reference U.S. Pat. Nos. 7,781,562 and 8,586,701.

Similarly, particularly suitable linear copolyester oligomers for the composition of the present invention are formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol. Such oligomers and methods for their manufacture are also described in the above-referenced and incorporated by reference U.S. Pat. No. 8,586,701. A process for making a polyester oligomer is also generally described for example in U.S. Pat. No. 6,906,164, assigned to the assignee of the present invention.

Processes suitable for producing linear polyesters and linear oligomers in accordance with the invention, e.g., transesterification and polycondensation reactions, typically have unintended side reactions that produce a certain level of macrocyclic species, such as cyclic dimer and trimer species. However, such unintended species account for less than 5, or less than 2, or less than 1 wt %, based of the total weight of the polymer or oligomer. Typically, the linear polymer or linear oligomer contains less than 1 wt % of macrocyclic side product species. Although the repeat unit for the linear polymer or oligomer in accordance with the invention contains cyclic groups contributed by the monomers, the resulting linear oligomer and linear polymer are not macrocyclic. In that regard, cyclic groups that are present in the monomer structures include a cyclo-hexyl ring in the 1,4-cyclohexanedimethanol (CHDM) monomer, a cyclo-butyl ring in the 2,2,4,4-tetramethyl-1,3-cyclobutanediol (TMCD) monomer, and a benzyl ring in the terephthalic acid (TPA) monomer. To provide a macrocyclic oligomer or polymer from repeat units that include CHDM, TMCD and TPA residues would require at least some bridging (or connection) of the linear repeat unit chain or at least some ring closure sufficient to provide an additional cyclic structure of a size sufficient to be considered macrocyclic, where the additional cyclic structure is in addition to the cyclic groups contributed by the CHDM, TMCD and TPA monomers.

In embodiments of the invention, the linear copolyester oligomer contains less than 5, or less than 3, or less than 2, or less than 1 wt % of macrocyclic species, based on the total weight of the oligomer. In one embodiment, the linear copolyester oligomer contains less than 1 wt % of macrocyclic species, based on the total weight of the oligomer. In embodiments of the invention, the linear copolyester oligomer contains no intentionally added macrocyclic species. In embodiments, the linear copolyester oligomer contains less than 2, or less than 1 percent branching.

In embodiments of the invention, the linear copolyester polymer contains less than 5, or less than 3, or less than 2, or less than 1 wt % of macrocyclic species, based on the total weight of the oligomer. In one embodiment, the copolyester polymer contains less than 1 wt % of macrocyclic species, based on the total weight of the oligomer. In embodiments of the invention, the copolyester polymer contains no intentionally added macrocyclic species. In embodiments, the linear copolyester polymer contains less than 2, or less than 1 percent branching.

In a preferred embodiment, the copolyester oligomer of the composition of the present invention is an intermediate of the copolyester polymer of the composition of the present invention. As used herein, the phrase "intermediate of the linear copolyester polymer" means that the linear copolyester oligomer is sourced from one or more points along the same reaction product stream that is used to manufacture the linear copolyester copolymer.

The respective amounts of linear copolyester polymer and linear copolyester oligomer present in the composition of the present invention can be varied depending on a number of factors that include for example the amount of the other ingredient(s), the properties of the linear copolyester polymer and linear copolyester oligomer and the desired properties of the composition. Suitable amounts of linear copolyester polymer in the composition of the present invention typically range from 99 to 60 percent by weight based on the total weight of the composition. Preferred amounts of linear copolyester polymer in the composition of the present invention range from 95 to 70 percent by weight based on the total weight of the composition. Suitable amounts of linear copolyester oligomer in the composition of the present invention typically range from 1 to 40 percent by weight based on the total weight of the composition. In embodiments of the invention, the amount of linear copolyester oligomer in the composition of the present invention is in the range from 2.5 to 30, or 2.5 to 20, or 2.5 to 15, or 2.5 to 10, or 5 to 30, or 5 to 25, or 5 to 20, or 5 to 15, or 5 to 10, or 10 to 30, or 10 to 25, or 10 to 20, or 10 to 15, or greater than 10 to 30, or greater than 10 to 25, or greater than 10 to 20, or greater than 10 to 15, or 15 to 30, or 15 to 25, or 15 to 20 percent by weight, based on the total weight of the composition. In certain embodiments, the amount of linear copolyester oligomer in the composition is in the range from 2.5 to 10 percent by weight, based on the total weight of the composition. In certain embodiments, the amount of linear copolyester oligomer in the composition is in the range from 5 to 10 percent by weight, based on the total weight of the composition. In certain embodiments, the amount of linear copolyester oligomer in the composition is in the range from 10 to 20 percent by weight, based on the total weight of the composition. In certain embodiments, the amount of linear copolyester oligomer in the composition is in the range from greater than 10 to 20 percent by weight, based on the total weight of the composition The compositions of the present invention also may contain other conventional additives and ingredients. For example, additives such as reinforcements, mold release additives, fillers, surface friction modifiers, light and heat stabilizers, extrusion aids, antistatic agents, colorants, dyes, pigments, fluorescent brighteners, antimicrobials, anticounterfeiting markers, hydrophobic and hydrophilic enhancers, viscosity modifiers, slip agents, tougheners, adhesion promoters, and the like may be used. Colorants, sometimes referred to as toners, may be added to impart a desired neutral hue and/or brightness to the composition. Optional ingredients such as these, as well as their chosen concentrations, are typically selected based on an individual composition's specific end-use specifications and application. For example, as the composition of the present invention is useful for forming injection molded articles, one aspect of the present invention is an injection molded article formed from the composition of the present invention.

In general, the linear copolyester polymer of the composition of the present invention may be formed using known methods and equipment for manufacture of polyesters or copolyesters. As discussed above, particularly suitable methods, for example those that include reacting a diester composition comprising a dialkyl ester of terephthalic acid with a diol composition that includes a first diol component including 2,2,4,4-tetramethyl-1,3-cyclobutanediol and a second diol component including 1,4-cyclohexanedimethanol in a reaction product stream, are described for example in U.S. Pat. Nos. 7,781,562 and 8,586,701, the disclosures of which are incorporated herein by reference. As described in these patents, this method generally includes the reacting of the above-referenced components to form a copolyester oligomer product stream and subjecting the copolyester oligomeric product stream to polymerization conditions in what is sometimes referred to in the art as a "finisher". Typically, the referenced subjecting step includes if not consists essentially of reactively connecting the oligomeric species in the copolyester oligomer product stream to form a copolyester copolymer of desired molecular weight, composition and structure. In certain embodiments, the above mentioned monomeric components are reacted in one or more transesterification reaction steps, followed by one or more polycondensation reaction steps. In certain embodiments, the oligomer is formed by one or more transesterification steps and the polymer is formed from the oligomer in one or more polycondensation reaction steps. In certain embodiments, the oligomer is formed by one or more transesterification steps and one or more polycondensation reaction steps, and the polymer is formed from the oligomer in one or more additional polycondensation reaction steps.

In general, the linear copolyester oligomer of the composition of the present invention may be formed from known methods and equipment for manufacture of polyester or copolyester oligomers. As discussed above, particularly suitable methods, for example methods that include reacting a diester composition that includes a dialkyl ester of terephthalic acid with a diol composition that includes a first diol component including 2,2,4,4-tetramethyl-1,3-cyclobutanediol and a second diol component including 1,4-cyclohexanedimethanol, are described for example in U.S. Pat. Nos. 7,781,562 and 8,586,701, the disclosures of which are incorporated herein by reference. As described in these patents, this method generally includes the reacting of the above-referenced components to form a copolyester oligomer product stream and subjecting the copolyester oligomer product stream to polymerization conditions in what is sometimes referred to in the art as a "finisher". Typically, the referenced subjecting step includes, more preferably consists essentially of, reactively connecting the oligomeric species in the oligomeric product stream to form a copolyester polymer of desired molecular weight, composition and structure. In such methods, the copolyester oligomer is an intermediate of the copolyester polymer.

In another aspect, the present invention includes a process for forming a copolyester resin composition having improved melt flowability. In this aspect, the process of the present invention includes (i) providing a linear copolyester polymer; (ii) providing a linear copolyester oligomer; and (iii) mixing the linear copolyester copolymer and the linear copolyester oligomer to form the polyester resin composition. In a preferred embodiment, the providing step (i) includes (a) reacting a diester composition that includes a dialkyl ester of terephthalic acid with a diol composition that includes a first diol component including 2,2,4,4-tetramethyl-1,3-cyclobutanediol and a second diol component including 1,4-cyclohexanedimethanol to form a reaction product stream that includes linear copolyester oligomer and (b) forming linear copolyester polymer from the linear copolyester oligomer. In a particularly preferred embodiment, the providing step (ii) includes sourcing linear copolyester oligomer from one or more points along the reaction product stream.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

EXAMPLE 1

In this example, copolyester resin compositions that include a linear copolyester polymer and a linear copolyester oligomer were formed. The linear copolyester polymer utilized in this example was a linear copolyester polymer commercially available from Eastman Chemical Company as TRITAN™ copolyester TX1500 HF. The linear copolyester oligomer utilized in this example was an intermediate of the linear copolyester copolymer procured by sourcing linear copolyester oligomer from the reaction product stream for the manufacture of the linear copolyester copolymer.

The extracted oligomer was ground to a powder (2 mm mesh) after solidification and both the polymer and oligomer were dried overnight in a vacuum oven at 150° F. The dried materials were blended to form a dry bag blend of the composition with the composition including 5 weight percent oligomer based on the total weight of the composition. The composition was then compounded using an 18 mm Leistritz™ extruder. All barrel zones were set to 260° C. and a constant screw speed of 200 rpm and constant feed rate setting of 20% were maintained as to target a melt temperature of about 254° C. As a control to indicate any impacts or effects created by the compounding procedure, the copolyester polymer was also compounded at the same settings.

Extruder motor load, melt pressure, and melt temperature were monitored as inidicators of melt flow performance. More specifically, motor load and melt pressure were used as indicators of melt viscosity, with relatively higher motor load and relatively higher melt pressure indicative of relatively higher melt viscosity and relatively lower motor load and relatively lower melt pressure indicative of relatively lower melt viscosity. A comparison of motor load and melt pressure data for the control sample and the sample with 5 wt % oligomer is set forth below in Table 1 below.

TABLE 1

|  | TX1500HF Control | TX1500HF w/5 wt % Oligomer |
|---|---|---|
| Motor Load (%) at 200 rpm | 85 | 67 |
| Melt Pressure (psi) at 200 rpm | 93 | 47 |

As evidenced by the data in the above Table 1, the compositions of the present invention, achieved a surprising 21% reduction in motor load and a 49% reduction in melt pressure when compared with the control. As noted above, the reduction in motor load and melt pressure is indicative of a reduction in melt viscosity (or an improvement in melt flowability).

Select characteristics and properties of the copolyester oligomer, the compositions of the present invention and the control materials were then measured. Molecular weight (Mn, Mw, Mz) and polydispersity (PD) were measured using gel permeation chromatography (GPC) with a refractive index detector and polystyrene standards employing a solvent mixture of 95 vol % methylene chloride and 5 vol % hexafluoroisopropanol, and inherent viscosity (IV) was calculated through correlation to measured molecular weight. The as-received (uncompounded) copolyester polymer was also added as a second control material (labeled "TX1500HF Control") to facilitate comparison with the compounded control. The results are indicated in Table 2 below:

TABLE 2

| | Sample | Mn | Mw | Mz | PD | IV |
|---|---|---|---|---|---|---|
| 1 | TX1500HF Control | 9051 | 17967 | 27179 | 1.985 | 0.61 |
| 2 | TX1500HF Compounded Control | 8713 | 17542 | 27032 | 2.013 | 0.60 |
| 3 | TX1500HF w/5 wt % oligomer | 8023 | 17213 | 26907 | 2.145 | 0.59 |
| 4 | Oligomer | 1917 | 3880 | 9322 | 2.024 | 0.21 |

As evidenced by the data in Table 2, the oligomer clearly has a lower molecular weight than the control materials but with a similar polydispersity. The addition of 5 wt % oligomer to the X1500HF polymer broadens the molecular weight distribution (larger PD) by about 7-8%.

Selected physical properties of the compositions of the present invention and the control materials were then measured. The results are indicated in Table 3 below, with testing procedures following ASTM D-638 or ASTM D-256 where applicable:

TABLE 3

| Sample | TS Yield (MPa) | TS Break (MPa) | EL Yield (%) | EL Break (%) | Tens Mod (MPa) | IZOD Notched (J/m) |
|---|---|---|---|---|---|---|
| TX1500HF Control | 43.3 | 50.1 | 5.6 | 151.2 | 1497.0 | 888.0 |
| TX1500HF Compounded Control | 43.2 | 44.1 | 5.5 | 113.2 | 1507.0 | 896.8 |
| TX1500HF w/5 wt % Oligomer | 44.2 | 42.7 | 5.3 | 110.0 | 1559.0 | 902.5 |

As evidenced by the data set forth in Table 3, the compositions of the present invention achieve a surprising improvement in melt flowability as discussed above while maintaining Tensile strength at yield (TS Yield), Elongation at yield (EL Yield), Tensile Modulus (Tens Mod), and Notched IZOD impact that is similar to the control. Tensile strength at break (TS Break) and Elongation at Break (EL Break) were negatively impacted by the oligomer addition; however, these are not believed to be significant for most molding or end use applications.

The glass transition temperature (Tg) for the composition of the present invention as well as the controls were then measured according to ASTM D-7028. The results are set forth in Table 4 below.

TABLE 4

| Sample | Glass Transition Temperature (° C.) |
|---|---|
| TX1500HF Control | 104.5 |
| TX1500HF Compounded Control | 104.4 |
| TX1500HF w/5 wt % Oligomer | 102.3 |

As evidenced by the data set forth in Table 4, the compositions of the present invention achieve an unexpected improvement in melt flowability as discussed above while exhibiting a glass transition temperature that is negligibly lower than the controls.

Manufacture of injection molded articles from the compositions of the present invention, as well as improved melt flow characteristics thereof, were then demonstrated. More specifically, compositions were subjected to a "spiral mold" testing procedure, similar to ASTM D-3123, wherein the compositions in molten form are injected at predetermined injection speed, test temperature and pressure into a heated mold with a spiral-shaped cavity. The length/distance of flow prior to melt solidification (or "freezing"), the freeze front profile and other variables are generally indicative of injection molding performance generally and melt flow performance specifically For this testing, a two-piece stainless spiral cavity mold with dimensions 0.126"×74" and the injection parameters below were employed:

| Injection Speed (in/s) | Barrel Temp (F.) | Mold Temp (F.) | Pressure (psi) | Time (s) | Shot Size (inch) | Cool Time (s) |
|---|---|---|---|---|---|---|
| 2 | 536 | 120 | 2000 | 10 | 3 OR 3.5 | 22 |

All the samples were thoroughly dried and retained in a dry state until just prior to molding. 10 runs of each sample were evaluated for length of flow.

The average flow length for these samples is set forth in Table 5 below:

TABLE 5

| Sample | Average Flow Length (in.) |
|---|---|
| TX1500HF Control | 31.1 |
| Compounded TX1500HF Control | 33.3 |
| TX1500HF + 5 wt. % oligomer | 36.6 |

While the general performance of all the samples in the above testing is indicative of their suitability for production of injection molded articles, the marked increase in spiral flow length achieved by the composition of the present invention is indicative of a reduction in melt viscosity (or an improvement in melt flowability).

EXAMPLE 2

In this Example 2, copolyester resin compositions that include a linear copolyester polymer and a linear copolyester oligomer were formed. The linear copolyester polymer utilized in this example was a linear copolyester polymer commercially available from Eastman Chemical Company as TRITAN™ copolyester TX1000. A linear copolyester oligomer was separately formed using starting materials for the referenced linear copolyester copolymer. Analysis of the oligomer revealed the following: Mn=2834; Mw=5041; Mz=7199; PD=1.779. The procedures set forth in Example 1 were then utilized in this Example to form multiple copolyester resin compositions of the present invention with 2.5, 5.0. 10.0 and 20.0 weight percent oligomer based on the total weight of the composition, respectively.

The compositions were then compounded using a 26 mm Coperion twin screw extruder. All barrel zones were set to 260° C. and a constant screw speed of 150 rpm and constant feed rate of 25 lbs/hr. As a control to indicate any impacts or effects created by the compounding procedure, the copolyester polymer was also compounded at the same settings.

Torque (analogous to the motor load parameter used in Example 1) and melt pressure were monitored as indicators of melt flow performance. More specifically, torque and melt pressure were used as indicators of melt viscosity, with relatively higher torque and and relatively higher melt pressure indicative of relatively higher melt viscosity and relatively lower torque and relatively lower melt pressure indicative of relatively lower melt viscosity. A comparison of torque and melt pressure data for the control sample and the samples of the compositions of the present invention is set forth below in Table 6 below.

TABLE 6

| Sample | Oligomer (%) | Torque (%) | Melt Pressure (psi) |
|---|---|---|---|
| TX1000 Comp Control | 0 | 93 | 1141 |
| TX1000 + 2.5% Oligomer | 2.5 | 90 | 1050 |
| TX1000 + 5% Oligomer | 5 | 86 | 1010 |
| TX1000 + 10% Oligomer | 10 | 80 | 905 |
| TX1000 + 20% Oligomer | 20 | 68 | 761 |

As evidenced by the data in the above Table 6, the compositions of the present invention achieved a surprisingly significant reduction in torque and in melt pressure when compared with the control. As noted above, the reduction in motor load and melt pressure is indicative of a reduction in melt viscosity (or an improvement in melt flowability).

Select characteristics and properties of the copolyester oligomer and the compositions of the present invention and the control materials were then measured. Molecular weight ($M_n$, $M_w$, $M_z$) and polydispersity (PD) were measured using gel permeation chromatography (GPC) and inherent viscosity (IV) calculated using the same procedures/techniques as described for Example 1. The graph depicted in FIG. 1 herein was also generated using the sample with 20 wt. % oligomer. The as-received (uncompounded) copolyester polymer was also added as a second control material (labeled "TX1000 Control") to facilitate comparison with the compounded control. The results are indicated in Table 7 below:

TABLE 7

| | Sample | Mn | Mw | Mz | PD | IV |
|---|---|---|---|---|---|---|
| 1 | TX1000 Control | 10522 | 20732 | 31403 | 1.97 | 0.70 |
| 2 | TX1000 Comp Control | 10194 | 20209 | 30792 | 1.98 | 0.68 |
| 3 | TX1000 + 2.5% Oligomer | 9597 | 19828 | 30653 | 2.07 | 0.67 |
| 4 | TX1000 + 5% Oligomer | 9023 | 19338 | 30282 | 2.14 | 0.66 |
| 5 | TX1000 + 10% Oligomer | 8166 | 18643 | 30037 | 2.28 | 0.65 |
| 6 | TX1000 + 20% Oligomer | 6793 | 17244 | 29453 | 2.54 | 0.61 |

As evidenced by Table 7 and FIG. 1, the oligomer clearly has a lower molecular weight than the control materials but with a similar polydispersity. The addition of oligomer to the X1000 polymer broadens the molecular weight distribution (larger PD) while FIG. 1 clearly indicates the post-compounding presence of the oligomer separate from the polymer.

Selected physical properties of the compositions of the present invention and the control materials were then measured. The results are indicated in Table 8 below, with testing procedures following ASTM D-638, ASTM D-256 or ASTM D-7028 where applicable:

TABLE 8

| Sample | TS Yield (MPa) | TS break (MPa) | Elong. Yield (%) | Elong. Break (%) | Tens. Mod. (MPa) | IZOD Notched (J/m) | Tg (° C.) |
|---|---|---|---|---|---|---|---|
| TX1000 Control | 44.2 | 59.0 | 5.8 | 188.4 | 1488 | 1099 | 107.3 |
| TX1000 Comp. Control | 44.4 | 52.2 | 5.6 | 155.3 | 1507 | 1100 | 106.8 |
| TX1000 + 2.5% oligomer | 44.6 | 54.6 | 5.6 | 173.9 | 1513 | 1107 | 105.2 |
| TX1000 + 5% oligomer | 44.9 | 61.0 | 5.6 | 201.6 | 1526 | 1086 | 105.4 |
| TX1000 + 10% oligomer | 45.6 | 46.9 | 5.4 | 146.3 | 1551 | 1138 | 103.2 |
| TX1000 + 20% oligomer | 46.5 | 44.9 | 5.2 | 128.5 | 1601 | 1140 | 100.1 |

As evidenced by the data set forth in Table 8, the compositions of the present invention achieve a surprising improvement in melt flowability as discussed above while maintaining Tensile strength at yield (TS Yield), Elongation at yield (EL Yield), Tensile modulus (Tens Mod), and Notched IZOD impact that is similar to the control. Tensile strength at break (TS Break) and Elongation at Break (EL Break) were negatively impacted by the oligomer addition: however, these impacts are not believed to be significant for most molding or end use applications. Further, reduction the glass transition temperature ($T_g$) was surprisingly limited.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A copolyester resin composition, said composition comprising:
    (i) a linear copolyester polymer formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol; and
    (ii) a linear copolyester oligomer formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol;
    wherein said linear copolyester polymer has an inherent viscosity (IV) in the range from 0.50 to 1.00 dL/g, measured in 60/40 (wt/wt) phenol/tetrachloroethane at a concentration of 0.5 g/100 ml at 25° C.; and
    wherein said linear copolyester oligomer has an IV less than 0.50 dL/g, measured in 60/40 (wt/wt) phenol/tetrachloroethane at a concentration of 0.5 g/100 ml at 25° C.

2. The composition of claim 1 wherein said copolyester oligomer is present in said composition in an amount of from 2.5 to 30 percent by weight based on the total weight of the composition.

3. The composition of claim 2 wherein said copolyester oligomer is present in said composition in an amount of from 2.5 to 10 percent by weight based on the total weight of the composition.

4. The composition of claim 1 wherein said linear copolyester oligomer is an intermediate of said copolyester polymer.

5. The composition of claim 1 wherein said linear copolyester oligomer has an inherent viscosity of less than 0.40 dL/g as determined in 60/40 (wt/wt) phenol/tetrachloroethane at a concentration of 0.5 g/100 ml at 25° C.

6. The composition of claim 5 wherein said linear copolyester oligomer has an inherent viscosity of less than 0.30 dL/g as determined in 60/40 (wt/wt) phenol/tetrachloroethane at a concentration of 0.5 g/100 ml at 25° C.

7. The composition of claim 4 further comprising at least one ingredient selected from the group consisting of reinforcements, mold release additives, fillers, surface friction modifiers, light and heat stabilizers, extrusion aids, antistatic agents, colorants, dyes, pigments, fluorescent brighteners, antimicrobials, anticounterfeiting markers, hydrophobic and hydrophilic enhancers, viscosity modifiers, slip agents, tougheners, adhesion promoters toners and colorants.

8. The composition of claim 1 wherein said linear polyester oligomer has an inherent viscosity of from 0.10 to less than 0.50 dL/g as determined in 60/40 (wt/wt) phenol/tetrachloroethane at a concentration of 0.5 g/100 ml at 25° C.

9. The composition of claim 8 wherein said linear polyester oligomer has an inherent viscosity of from 0.10-0.40 dL/g as determined in 60/40 (wt/wt) phenol/tetrachloroethane at a concentration of 0.5 g/100 ml at 25° C.

10. The composition of claim 9 wherein said linear polyester oligomer has an inherent viscosity of from 0.10-0.30 dL/g as determined in 60/40 (wt/wt) phenol/tetrachloroethane at a concentration of 0.5 g/100 ml at 25° C.

11. An injection molded article formed from the composition of claim 4.

12. The composition of claim 1 wherein said linear copolyester polymer is present in the amount of from 99 to 60 percent by weight based on the total weight of the composition.

13. The composition of claim 12 wherein said linear copolyester polymer is present in the amount of from 95 to 70 percent by weight based on the total weight of the composition.

14. The composition of claim 1 wherein the inherent viscosity of said linear copolyester polymer is from 0.60 to 0.75 dL/g as determined in 60/40 (wt/wt) phenol/tetrachloroethane at a concentration of 0.5 g/100 ml at 25° C.

15. A process for forming a copolyester resin composition, said process comprising:
    (i) providing a copolyester polymer;
    (ii) providing a linear copolyester oligomer; and (iii) mixing said copolyester copolymer and said polyester oligomer to form said polyester resin composition;

wherein said copolyester polymer is a linear copolyester polymer formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol, and having an inherent viscosity (IV) in the range from 0.50 to 1.00 dL/g, measured in 60/40 (wt/wt) phenol/tetrachloroethane at a concentration of 0.5 g/100 ml at 25° C.; and wherein said linear copolyester oligomer is a linear copolyester oligomer formed by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol, and having an IV less than 0.50 dL/g, measured in 60/40 (wt/wt) phenol/tetrachloroethane at a concentration of 0.5 g/100 ml at 25° C.

16. The process of claim 15 wherein said providing step (i) comprises (a) reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol to form a reaction product stream comprising linear copolyester oligomer and (b) forming linear copolyester polymer from the linear copolyester oligomer.

17. The process of claim 16 wherein said providing step (ii) comprises sourcing said linear copolyester oligomer from one or more points along said reaction product stream.

* * * * *